BEST AVAILABLE COPY

3 Sheets--Sheet 1.

P. NOYES.

Apparatus for Drawing Oil, &c.

No. 5,198. Reissued Dec. 24, 1872.

Witnesses
John E. Crane
Chas. Hunt

Inventor
Person Noyes

222. DISPENSING.
111
BEST AVAILABLE COPY
3 Sheets--Sheet 2.
P. NOYES.
Apparatus for Drawing Oil, &c.
No. 5,198. Reissued Dec. 24, 1872.
Fig. 2
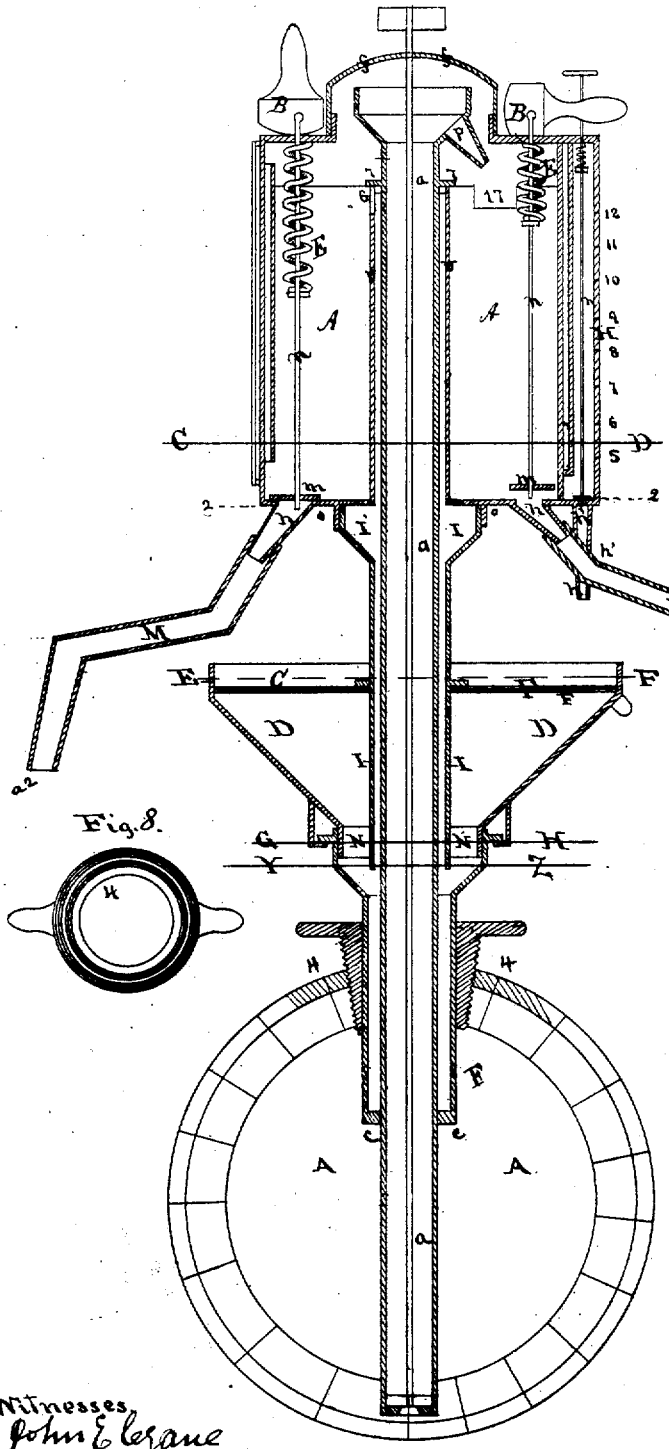
Fig. 3.
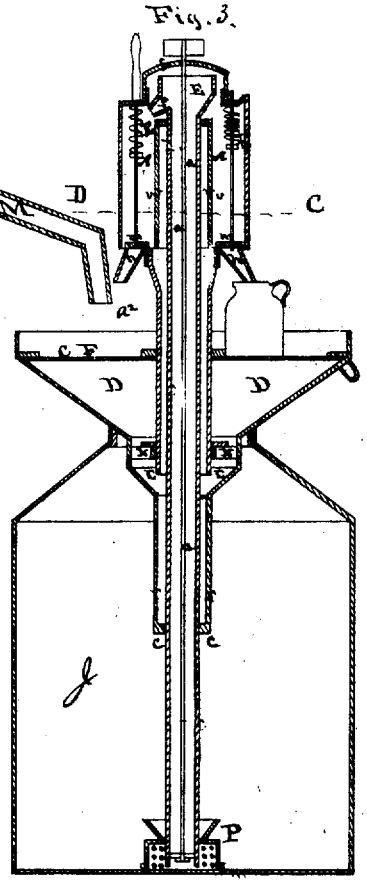
Fig. 8.
Witnesses,
John E. Crane
Chas. Hunt
Inventor
Person Noyes
AM. PHOTO-LITHOGRAPHING CO. (OSBORNE'S PROCESS.)

222. DISPENSING.

111

3 Sheets--Sheet 3.

P. NOYES.

Apparatus for Drawing Oil. &c.

No. 5,198. Reissued Dec. 24, 1872.

Witnesses.
John E Crane
Chas Hunt

Inventor.
Person Noyes

AM. PHOTO-LITHOGRAPHIC CO. N.Y. (OSBORNE'S PROCESS.)

222 DISPENSING
BEST AVAILABLE COPY
Search Roo

UNITED STATES PATENT OFFICE

PERSON NOYES, OF LOWELL, MASSACHUSETTS.

IMPROVEMENT IN APPARATUS FOR DRAWING OILS, &c.

Specification forming part of Letters Patent No. 96,340, dated November 2, 1869; reissue No. 5,198, dated December 24, 1872.

*To all whom it may concern:*

Be it known that I, PERSON NOYES, of Lowell, in the county of Middlesex and State of Massachusetts, have invented an Improved Apparatus for Storing, Drawing, and Measuring Liquids, of which the following is a full, clear, and exact description, reference being had to the accompanying drawing making part of this specification.

Figure 4:
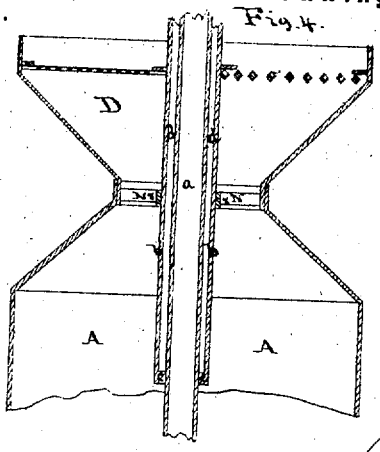
Figure 12:
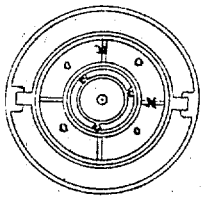
Figure 9:
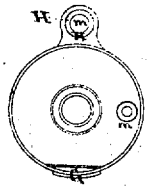
Figure 13:
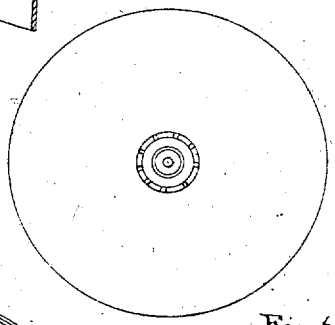
Figure 1:
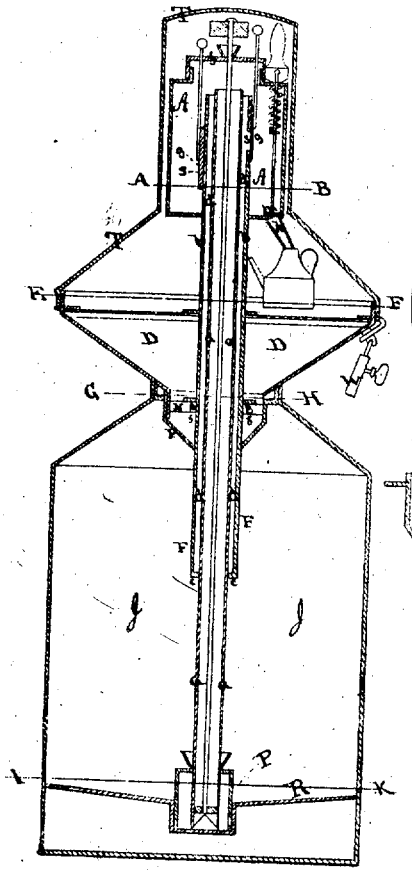
Figure 11:
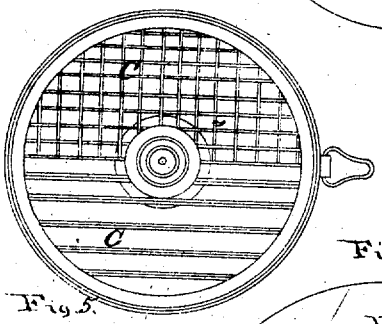
Figure 6:
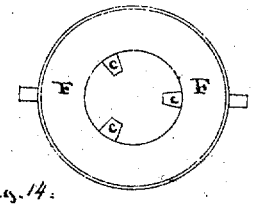
Figure 14:
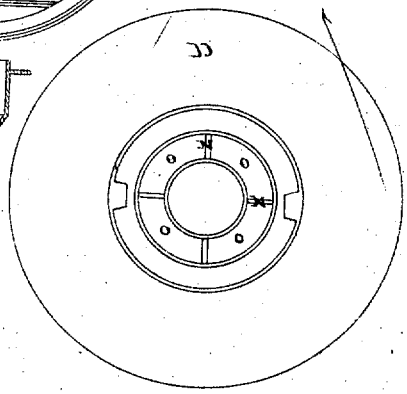
Figure 5:
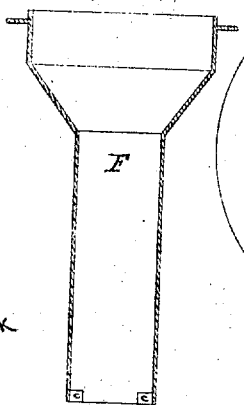
Figure 7:
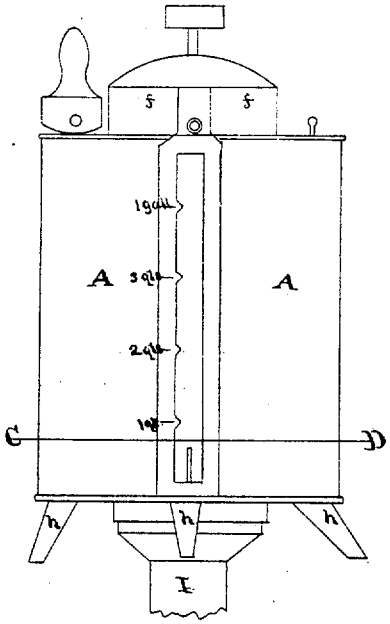
Figure 10:
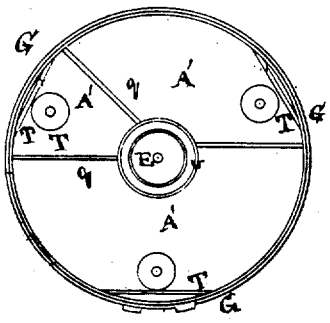

Figure 1 represents a vertical central section of the invention as applied to a can or jar, having a continuous return or overflow tube, *b*, extending from the measuring-receptacle A into the can. Fig. 2 is a vertical central section of the invention as applied to a cask or barrel, and having the return or overflow tube I terminating in the sink D. In this figure a tube, F, attached to the sink, extends some distance into the barrel and serves to conduct any oil poured or falling into the sink into the barrel or cask. Fig. 3 is a vertical central section of the modification shown in Fig. 2 as applied to a jar or can. Fig. 4 is an enlarged central vertical section of part of an oil can or jar and the sink D, showing the manner of applying and using the latter, the continuous return-tube *b*, and the pump when the return-tubes I and F are not used. In this figure, the oil poured or falling into the sink D escapes into the can below between the bridge-work N, which holds the tube *b* in place. Figs. 5 and 6 are a central section and top-end view of the tube F, showing the locking-lips *i* used as in applying it as in Fig. 2. Fig. 7 is a side elevation of the measuring-receptacle A and its return-tube I, which serves to support it and to conduct the overflow back to the sink D. Fig. 8 is a bottom-end view of the bung-hole bushing L. Figs. 9, 10, 11, 12, and 13 each represent a horizontal section—Fig. 9, on the line A B of Fig. 1; Fig. 10, on the line C D of Figs. 2, 3, and 7; Fig. 11, on the line E F of Fig. 1, except that in Figs. 2 and 9, a tubular glass, H, is shown, instead of the flat glass G shown in Fig. 7. Fig. 14 is a bottom-end view of the conical sink D from above the line Y Z of Fig. 1 or 2, and to which the cap or cover F is adjusted.

My invention relates to a new and improved apparatus for storing, pumping, or drawing and measuring oils. It is designed for use in manufactories, machine-shops, stores, and all places where facility, neatness, and economy in keeping and dealing out oils or other liquids are objects of importance.

*a* is the tube of a pump projecting into the tank from above. Extending downward a suitable distance into the tank from within the measuring-receptacle is a conducting or return tube, *b*, a space, *d*, being left between it and the pump, closed at the top and open at the bottom, small stays *c* holding the tube *d* in place. At the top of the tube *b* is a measuring-receptacle, A, made tight at the bottom, and with its top rising high enough to be adjusted to its cover *f*. At the bottom and side of receptacle A is placed a draft-tube, *h*, through which the liquid is drawn off. A valve, *m*, shuts the hole 2 at the top of tube *h*, and is lifted by a rod, *n*, attached to the valve at the lower end and at the top to a lever or rocking cam, B. The valve *m* is held down by a spiral spring, E, acting against the cover *f*, and is opened by turning the handle of the cam B. Fig. 10 shows a measuring-receptacle divided into three compartments, A′, each of which is a measure of different capacity from the others. The nose *p* of the pump or the receptacle A is made to rotate, so as to pump the oil into either compartment A′ at pleasure. The capacity of each compartment A′ is graduated by the height of the intervening partition, allowing the oil to flow into adjacent compartments when the one in use is full. All surplus oil discharged from any compartment will fall into the sink D, and be returned to the storing-tank beneath, through the return-tube F. The measuring-receptacle A, shown in Figs. 1 and 9, has no compartments. Here the oil is pumped up as before, but the quantity in the receptacle A is indicated by points arranged to cover partially or wholly a vertical glass, G, set in the side of the tank. The points have letters and figures set against them to indicate the quantity of oil each measures, as shown in Fig. 7. These devices are old and well known; I make no claim to them. Within the receptacle A, shown in Figs. 1 and 9, openings 3 are formed in the sides of the return-tube *b*, covered by sliding gates *g*, operated by vertical rods 5 passing through the cover *f*. In measuring liquids by these gates, a sufficient quantity is pumped into the measuring-receptacle, the proper gate 3 is raised,

BEST AVAILABLE COPY and the surplus oil flows back to the tank below through the return-tube *b*. The remainder in the receptacle A, being a given quantity—as a quart, pint, or gallon—is then drawn off through the outlet *h*. Tubular indicators H, are shown in Figs. 2 and 9, of glass. At the lower end of the indicators a valve, *m*, is arranged with an outlet, *h*, like those before described, and operated in like manner. In a compartment measuring-receptacle, A, the surplus liquid instead of flowing into adjacent compartments, may be made to flow into the return-tubes I F by means of notches at top of tube *b*, as at 6 in Fig. 2. The tube F is either made separate, as shown in Figs. 2, 5, 6, and 12, secured to the sinks D by locking-lips *i*, or is made in one with the sink D, as in Fig. 3. This tube projects downward into the cask or tank, as shown, to some distance, and serves not only to convey the oil falling into the sink D, but also to prevent the ready escape of oil from or slopping over of the cask or tank if rolled about or overturned by accident. The tube F and sink D are applied to a jar, can, cask, or barrel, by screwing or driving a bushing, L, into the mouth or bung-hole, and inserting the tube F through the bushing. In Fig. 2 a central return-tube, I, is shown, between the tube F and the measuring-receptacle. This tube passes through a platform-grating, C, in the top of the sink, and is secured at its lower end to the lower part of the sink by a collar or ring, *e*, and bridge-work *n*. Where it passes through the grating the tube I is supported by a collar, 9, and a flange, 10. The measuring-receptacle A rests and is supported on top of the tube I, and is held in position by the circular flange *o* depending from the bottom of the tank.

The pump being in place, the pump-rod passing through the cover *f*, and the other parts arranged as described, the apparatus is ready for operation. Zigzag pipes M are attached to the tube *h*, to assist in conveying the contents of the jar, tank, or cask, to others. C is a platform-grating in the sink D at a convenient point, having its slats of woven wire or with their upper and lower edges sharp or angular, as in Figs. 4 or 11, that any oil or liquid falling on them may flow immediately down through the sink to the storing-tank, and not corrode or gum up the grating, or be liable to explosion, as is the case when any perforated flat surface is used. This platform-grating may be used to support cans or other receptacles, as shown at K in Fig. 1.

In pumping oil from a flat-bottom jar, to provide for more fully emptying the jar, I form a sunken step, S, below the bottom R, and insert the lower end of the pump, covered with a strainer, P, of common construction, into the step. Two or more outlets may be used at the same time upon the measuring-receptacle *a*, if desired. A cap, T, is fitted over the apparatus, and is fastened to the sink by a staple, *c*[1], hasp *c*[2], and padlock W, if desired. The cap serves to keep out dust or dirt, prevents evaporation, and renders the apparatus comparatively safe from fire.

With the flat-glass indicators G I generally apply a reflector, *y*, within the tank a short distance back of the glass, so that the top or surface line of the liquid may be readily seen. The sliding-gates *g* and rods 5 may be dispensed with, if desired, when the tubular glass indicator, with valve-operating rod and outlet-tube *h* is used.

A pump-tube, with receptacle A, and other apparatus described, may be of sufficient length to extend from the cask or liquid-holder in the cellar to the first or second floor above, where the oil may be measured and put up, as described. The oil may thus be kept in the cellar, where the low temperature prevents waste by evaporation, while at the same time room is economized in the upper apartment, and it is kept comparatively clean and free from offensive odors.

By removing the pump-measuring apparatus and loose platform-grating from the sink D it and the tube F may be used as a tunnel to the extent of its capacity.

I am aware that valves have been raised and operated, as described, and that a pump having a nose or outlet which could be turned to discharge liquid on either side has been used. I am also aware that a standing fountain formed of the pump top, provided with a measuring-gage and stop-cock in the nose of the pump, are old and well-known, as also the strainer at the bottom of the pump; and I make no claim to either of these devices alone, or in combination with the pump or the pump and sink.

What I claim as new, and desire to secure by Letters Patent, is—

1. A pumping and measuring apparatus, consisting of the pump, return-tube, sink with its discharge-passages, and measuring-receptacle A, all constructed, combined, and arranged in relation to each other and to the storing-tank, in the manner and for the purpose specified.

2. The return-tube *b*, combined with the tank A, the latter provided with outlets and discharge-valves *m*, in the manner and for the purpose specified.

3. The combination of the return-tube F, projecting into the barrel, with the storing-tank or barrel, the sink D, and pump, all arranged and operated substantially as described.

4. The measuring-receptacle A, in combination with the pump-tube *a* and return-tube *b*, having notches or openings 6 into the compartments A, as described, and for the manner specified.

Witnesses: PERSON NOYES.

JOHN E. CRANE,

CHAS. HUNT.